Patented Oct. 2, 1951

2,569,939

UNITED STATES PATENT OFFICE 2,569,939

INFRARED PHOSPHORS

Donald W. Lyon, Wilmington, Del., assignor to E. I. du Pont de Nemours and Company, Wilmington, Del., a corporation of Delaware No Drawing. Application December 22, 1949, Serial No. 134,602

9 Claims. (Cl. 252—301.4)

This invention concerns infrared-sensitive phosphors and means for their preparation.

Presently-known infrared phosphors are generally of two types, metal sulphides and metal selenides, with various activating agents. Such compounds, particularly alkaline earth metal selenides or sulphides, are characterized by their strong emission after infrared irradiation, and by the lengthy time period during which such emission persists. For certain applications, however, this strength and persistence is undesirable; and it is necessary to develop new classes of infrared phosphors of relatively weak and evanescent emission qualities. To develop such a class is among the objects of this invention. A specific object is to prepare infrared-stimulable substances which emit a weaker light, and which are less able to store excited energy, than conventional sulphide and selenide phosphors. Other objects and advantages of the invention will be apparent from the ensuing description thereof.

These and other objects are attained by my present invention which broadly comprises activating with samarium and cerium an oxidic compound or double oxide of calcium with at least one element adapted to form a white acidic oxide selected from the group consisting of aluminum, molybdenum, silicon, tin, titanium and vanadium. The activation is effectuated by heating such oxy-compound with a samarium activator and a cerium activator. The products of this heat treatment are infrared-stimulable phosphors comprising a double oxide of calcium with aluminum, molybdenum, silicon, tin, titanium or vanadium, or with mixtures thereof, activated by samarium and cerium.

According to one specific embodiment of my invention, I form the double oxide of calcium with the other element or elements desired and activate the same, in one and the same operation. For this purpose I intimately commingle, in wet or dry state and in substantially chemically equivalent proportions, an oxide of calcium and an oxide of the second element; or, alternatively, compounds of such substances which on calcination and/or oxidation yield the oxides sought may be commingled. A samarium compound and a cerium compound are then added to the resulting mixture and likewise intimately mixed therewith. The mass is then heated under non-reducing or oxidizing conditions at at least 800° C. and preferably at between 800° C. and 1300° C. The product infrared phosphor consists essentially of calcium aluminate, calcium molybdate, calcium silicate, calcium stannate, calcium titanate, calcium vanadate or mixtures thereof, activated with samarium and cerium.

The oxidic compounds or so-called "double oxides" which are useful in my invention are those of calcium with at least one of the aforementioned elements aluminum, molybdenum, silicon, tin, titanium or vanadium. Although perhaps more correctly designated, e. g., $3CaO.Al_2O_3$, $2CaO.SiO_2$, etc., such compounds are popularly referred to as calcium aluminate, calcium silicate, and the like. Any compounds may be employed as raw materials which will produce such double oxides after heating and/or oxidation. Thus, an oxide of calcium, such as lime or a per-oxide and an oxide of the desired second element may be used, or their respective chlorides, or their carbonates (yielding gaseous $CO_2$ and the oxides on calcination), or the like can be employed. To achieve the desired infrared sensitivity of my invention, it is essential that the base material comprise a double oxide of calcium with one or more of these specifically-noted second elements.

These double oxide bases must be activated specifically with samarium and with cerium; if either one be omitted, infrared activity is checked. Activity is also affected by the particular concentrations of each of these agents. Those concentrations most useful in achieving optimum activation may be termed generically "activator amounts." For instance, the base material should generally be treated with from 0.001 to 0.01% by weight of samarium, and preferably with between 0.002 and 0.006% by weight thereof. Cerium content should broadly range between 0.001 and 0.1% by weight, while from 0.005 to 0.05% is usually fully satisfactory. It is unimportant in what form the two activating agents are introduced to the base material; although such agents are generally referred to in the art and herein simply as the elements, it should be understood that they are actually most often utilized in some chemical combination. Thus, samarium and cerium may be added in the form of their oxides, or as various organic or inorganic salts (e. g., their chlorides, chlorates, nitrates, sulphates, acetates, etc.), or the like.

As previously mentioned, the two activators and the base material must be intimately mixed, and any procedure which accomplishes this purpose is satisfactory. For example, the activators and the base may be mixed in the dry state, or the activators in the form of water-soluble salts may be added in solution and milled with the base to form a paste. The phosphor material must be heat-treated after these activating agents have been incorporated therewith, in order to develop the desired infrared sensitivity. To effectuate this, temperatures of at least 800° C. and up to about 1300° C. should generally be used, while between 1050° C. and 1150° C. is often a satisfactory or preferred range. Since one is working with oxidic compounds, it is also important that these be prevented from reduction during such calcination; hence, there should be a non-reducing atmosphere within the heating chamber.

As previously discussed, one may employ as raw materials either the oxides of calcium and the other element or elements, or compounds which will produce the double oxide after heating and/or oxidation. The desired double oxide may be first prepared by known means, and samarium and cerium subsequently incorporated and calcined therewith. It is frequently more feasible economically, however, to utilize other compounds of calcium and the second element, such as the carbonates or chlorides or the like and to add the two activating agents thereto at the same time; one calcination treatment will then serve to produce the desired double oxide and at the same time to activate it. It is important that the atmosphere within the calcination chamber be at least non-reducing, so that the oxy-compound or compounds will not be affected; and when raw materials are chosen which require oxidation to form a double oxide, an oxidizing atmosphere, such as of air or oxygen, should prevail in the chamber.

The time of heat treatment may vary materially depending upon various other operating factors: e. g., the reactants used, the temperature, the type of product desired, and the like. If the particular raw materials employed are in the form of compounds requiring heat and/or oxidation to develop the double oxide, opportunity for such development must be given, as well as opportunity for activation. As above indicated, the temperature of calcination is another of the interdependent conditions which will also be of weight. It may generally be said that in most operations from fifteen minutes to a few hours will be sufficient calcining time at temperatures between about 800° C. and 1300° C.; between one-half and two hours will often be fully satisfactory. As in prior art methods for preparing phosphors, a fluxing agent may be used, if desired; however, it does not appear to accelerate or otherwise aid calcination in my process so materially as it does in prior methods.

The following examples are given simply in illustration of my invention and not at all in limitation of its scope:

Example I

CaO and $SnO_2$ were mixed in the proportions by weight of 8.53:11.47. To the mixture were added a water solution of samarium chloride (providing 0.005% Sm by weight) and 0.03% by weight of cerium. The mass was milled to form a paste and then calcined in silica equipment, in a non-reducing atmosphere, for 45 minutes at 1050° C. The product, calcium stannate, was a yellow-brown powder, emitting orange light after excitation by an 1850 Å. energy source and stimulation by near infrared radiation. Such emission light was of relatively brief duration, the phosphor having only a short energy-storage period.

Example II

A calcium titanate phosphor was prepared by commingling 20.85 parts by weight of $CaCO_3$ and 8.32 parts of $TiO_2$. To this mixture 0.01% by weight of cerium and 0.004% of samarium were added in dry form and thoroughly incorporated. The material was then heated in air at 1100° C. for 30 minutes. The resulting yellow-pink powder exhibited relatively brief, red-orange emission with infrared following ultraviolet excitation.

Example III

CaO in the amount of 12.45 parts by weight was calcined with 7.55 parts by weight of $Al_2O_3$ to produce calcium aluminate. The product was then treated with 0.003% by weight of samarium and 0.009% of cerium and heated at 1000° C. for one hour. A calcium aluminate phosphor resulted, a white powder exhibiting orange phosphorescence when duly excited and stimulated as described in Example I.

Example IV $CaCO_3$ and $MoO_3$ were mixed in the proportions by weight of 19.24:9.22 and milled into a paste with 0.005% by weight of cerium and a dilute water solution of samarium chloride (yielding 0.002% by weight Sm). This paste was dried at 105° C. and then calcined for ½ hour in air at 1125° C. The product calcium molybdate phosphor was a whitish powder, and showed a red-orange phosphorescence after suitable U. V. excitation and infrared irradiation.

Example V 23.25 parts by weight of $CaCO_3$ (to yield 13.03 parts of CaO) and hydrous silica containing 6.97 parts by weight of $SiO_2$ were mixed and treated in air at 1150° C. for 15 minutes with 0.006% by weight of samarium and 0.05% of cerium. The product was a calcium silicate phosphor, infrared-stimulable like the products of the previous examples.

As previously discussed, my new process provides novel infrared-sensitive phosphors which have properties now desired in certain fields: relatively weak phosphorescence and relatively short energy-storage periods. The products of my method comprise a new class of phosphorescent substances. Prior experimenters knew of only a very few oxy-compounds which were infrared-sensitive, and looked upon various metal sulphides or selenides as the usual infrared phosphors of commerce. However, I have now provided means whereby a new group of such phosphors may be readily prepared, and from base materials which are generally well-known oxy-compounds.

I claim as my invention:

1. A process for the production of an infrared-sensitive phosphor which comprises heating together, at temperatures ranging from 800° C.–1300° C. and until infrared sensitivity is developed, from 0.001 to 0.01% by weight of a samarium activator, from 0.001 to 0.1% by weight of a cerium activator and an oxide of calcium with a stoichiometric proportion of a compound selected from the group consisting of an oxide of an element from the group aluminum, molybdenum, silicon, tin, titanium and vanadium and a compound of said elements which yields an oxide during said heating.

2. An infrared-stimulable phosphor consisting essentially of a calcium compound selected from the group consisting of calcium aluminate, calcium molybdate, calcium silicate, calcium stannate, calcium titanate and calcium vanadate, activated with from 0.002 to 0.006% by weight of samarium and between 0.005 and 0.05% by weight of cerium.

3. An infrared-stimulable phosphor consisting essentially of calcium silicate activated with between 0.002 and 0.006% by weight of samarium and with from 0.005 to 0.05% by weight of cerium.

4. An infrared-stimulable phosphor consisting essentially of calcium aluminate activated with between 0.002 and 0.006% by weight of samarium and with from 0.005 to 0.05% by weight of cerium.

5. An infrared-stimulable phosphor consisting essentially of calcium molybdate activated with between 0.002 and 0.006% by weight of samarium and with from 0.005 to 0.05% by weight of cerium.

6. A process for the production of an infrared-sensitive phosphor which comprises intimately mixing substantially chemically equivalent amounts of an oxide of calcium with a compound selected from the group consisting of an oxide of an element from the group aluminum, molybdenum, silicon, tin, titanium and vanadium, and a compound of said elements which breaks down on heating to form an oxide of said elements, between 0.001 and 0.01% by weight of samarium and between 0.001 and 0.1% by weight of cerium, and heating said mixture in an oxidizing atmosphere at a temperature of from 800° C. to 1300° C. until desired infrared sensitivity is deveoleped.

7. A process for the production of an infrared-sensitive phosphor which comprises heating together, at a temperature of between 800° C. and 1300° C. and under non-reducing conditions an intimate mixture of substantially chemically equivalent amounts of calcium oxide, an oxide of an element selected from the group consisting of aluminum, molybdenum, silicon, tin, titanium and vanadium, from 0.001 to 0.01% by weight of a samarium activator and between 0.001 and 0.1% by weight of a cerium activator, and continuing said heating until desired infrared sensitivity is developed in the resulting reaction product.

8. A process for the production of an infrared-sensitive phosphor which comprises mixing together substantially chemically equivalent amounts of calcium oxide and a compound of an element selected from the group consisting of an oxide and a compound of an element from the group aluminum, molybdenum, silicon, tin, titanium and vanadium, said latter compound being capable on oxidation of yielding the corresponding oxide, adding to said mixture from 0.001 to 0.1% by weight of a samarium activator and between 0.001 and 0.1% by weight of a cerium activator, and simultaneously oxidizing and activating the mass by heating the same in an oxidizing atmosphere at between 800° C. and 1300° C. until infrared sensitivity is developed.

9. A method for producing an infrared-sensitive phosphor which comprises intimately mixing, in substantially stoichiometric proportions, an oxide of calcium with a compound selected from the group consisting of an oxide of an element selected from the group consisting of aluminum, molybdenum, silicon, tin, titanium and vanadium and a compound of said elements which yields on oxidation the corresponding oxide, together with from between 0.002 and 0.006% by weight of samarium and from 0.005 to 0.05% by weight of cerium, and then heating the resulting mixture in a non-reducing atmosphere at temperatures ranging from about 1050–1150° C. until the resulting reaction product develops infrared sensitivity.

DONALD W. LYON.

REFERENCES CITED

The following references are of record in the file of this patent:

UNITED STATES PATENTS

| Number | Name | Date |
|---|---|---|
| 2,447,322 | Fonda | Aug. 17, 1948 |
| 2,462,547 | Pitha | Feb. 22, 1949 |
| 2,470,451 | Wood | May 17, 1949 |
| 2,522,074 | Urbach | Sept. 12, 1950 |